Aug. 31, 1943.  W. G. HANCHOCK  2,328,337
RECIPROCATING ELECTROMAGNETIC MOTOR
Filed July 16, 1941

Inventor
William G. Hanchock
By
Attorneys

Patented Aug. 31, 1943

2,328,337

UNITED STATES PATENT OFFICE 2,328,337

RECIPROCATING ELECTROMAGNETIC MOTOR

William G. Hanchock, Detroit, Mich.

Application July 16, 1941, Serial No. 402,666

11 Claims. (Cl. 172—126)

This invention relates to a new and useful improvement in reciprocating electro-magnetic motors.

One of the objects of this invention is to provide a pair of magnets having opposite polarity and another magnet reciprocating within each of the first-named magnets with appropriate switching means to reverse the polarity of the inner magnet so as to cause a reciprocation of the inner magnet.

Another object of the invention is to provide a switch which will reverse the direction of flow of electricity through a reciprocating magnet upon movement of the magnet with respect to an abutment on the switch.

Still another object of the invention is to provide an appropriate system of electrical wiring to accomplish the objects set forth above.

Other and further objects will appear from the following description of my invention in reference to the accompanying drawing, in which.

Figure 1:
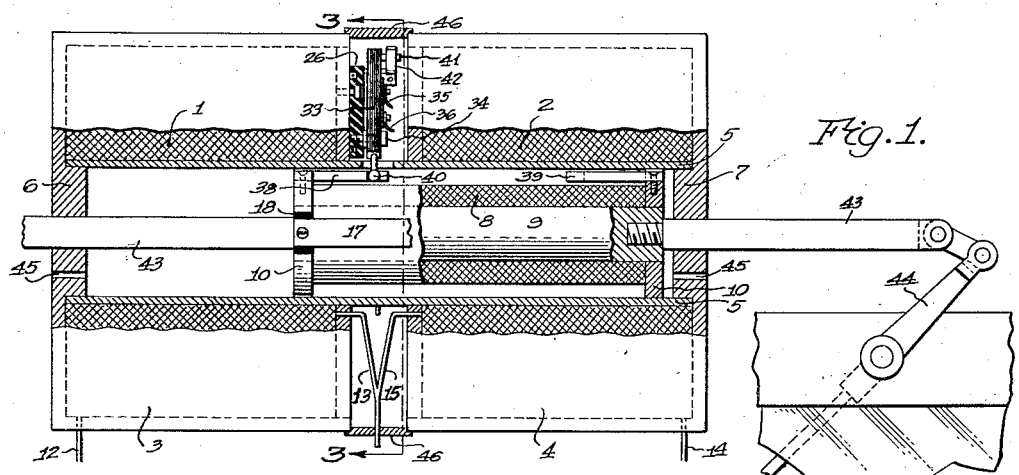
Figure 1 is a front elevation of the device, the same being partially broken away in section to show the inner coil, and the coil being likewise partially broken away in section.

This device employs a pair of spaced electric coils 1 and 2 composed of windings of wire to form electro-magnets. The coils 1 and 2 are encased in steel casings 3 and 4 respectively so as to form enclosed electro-magnetic circuits. The coils 1 and 2 are hollow in their central portions, and within the hollow core is placed a tube 5 of non-ferrous material which fits over bosses 6 and 7 in the cases 3 and 4 respectively so as to be firmly and securely held in position and likewise to space the electro-magnetic coils 1 and 2 apart at a predetermined distance. Within the tube 5 is a third coil 8 of wire wound about a core 9. The core 9 has fitted to each end thereof collars 10 which have a diameter slightly smaller than the inner diameter of the tube 5 so that the collars may slide easily within the tube 5 as the coil 8 and core 9 slide and position the coil 8 and core 9 centrally with respect to the interior of the tube 5.

Figure 4:
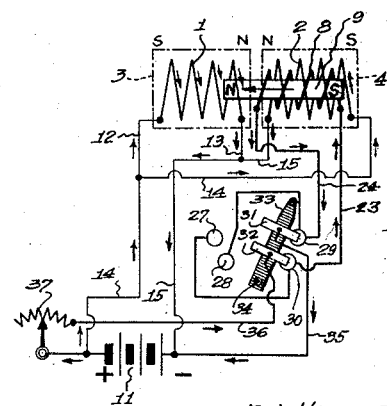
Figure 4 is a wiring diagram of the device.

This device is particularly adapted for use as a motor to drive a windshield wiper on an automobile, although it may be adapted to many other uses. At any rate, a source of electrical energy such as a battery 11 is provided, and from the battery 11, as shown in Figure 4, a number of lead wires are installed. One lead wire 12 leads from the positive side of the battery 11 directly to one end of the coil 1 and another lead wire 13 leads from the opposite end of the coil 1 to the negative side of the battery 11. Another lead wire 14 leads from the positive side of the battery 11 to one end of the coil 2 and still another lead wire 15 leads from the other end of the coil 2 back to the negative side of the battery 11. The wiring of the coils 1 and 2 and the positioning of the lead wires is such that the coils have opposite magnetism. In other words, the north poles of the coil 1 and of the coil 2 are on the inside, as shown in Figure 4, and the south poles of each of the coils 1 and 2 are on the outside. This magnetism is not changed during the operation of my device but is constant so long as the current is on.

However, my device contemplates that the polarity of the coil 8 or inner magnet which slides within the tube 5 will be reversed at each end of the stroke by appropriate switch means which will be hereinafter described. Accordingly, one end of the coil 8 is attached to a sliding contact bar 16 and the other end of the coil is attached to a similar sliding contact bar 17. Each of these bars is insulated from the collars 10 by proper insulating means 18 but is firmly attached to the collars through the insulating means. Spring contacts or brushes 19 and 20 contact the bars 16 and 17 respectively with a sliding contact so that as the bars move longitudinally, there is a constant electrical connection through the contacts 19 and 20. The contacts 19 and 20 may be attached to the case 3 through insulating means 21 and 22 respectively. Lead wires 23 and 24 respectively lead from the spring contacts 19 and 20.

My device also employs a double-pole, double-throw reversing switch 25 to reverse the direction of flow through the coil 8. This switch 25 is mounted through insulating means 26 upon the steel case 3 so as to be electrically insulated therefrom. The switch 25, as shown particularly in Figure 3, has four permanent contacts 27, 28, 29 and 30. The contacts 27 and 30 are joined together and the contacts 28 and 29 are joined together, and the contacts 27 and 30 are connected to the lead wire 23 and the contacts 28 and 29 to the lead wire 24. A pair of movable contacts 31 and 32 are mounted on an insulated member 33 which is pivoted about a point 34 so that the contact 31 may contact the point 29 at the same time the contact 32 is contacting the point 30, or if the member 33 is shifted about the pivot 34, the contact 31 will contact the point 27 at the same time that the contact 32 is contacting the point 28. The contact 31 is connected by a lead wire 35 to the negative side of the battery 11 and the contact 32 is connected by a lead wire 36 to a rheostat 37, which in turn is connected to the positive side of the battery 11. By proper adjustment of the rheostat 37, the amount of current through the circuit of the coil 8 may be adjusted.

Figure 2:
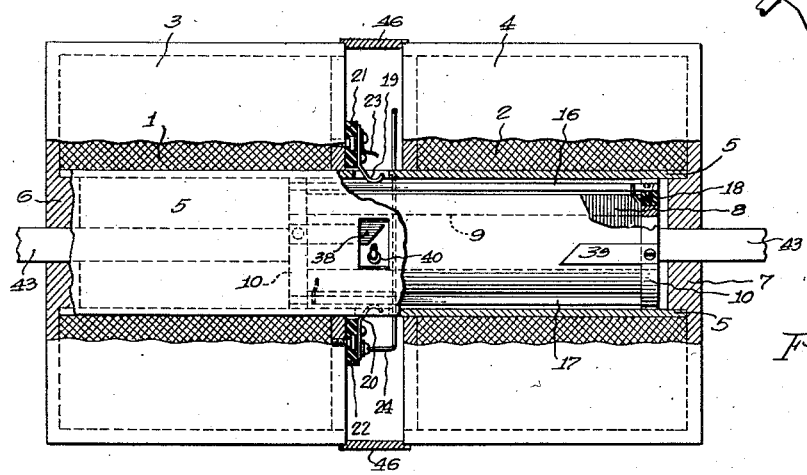
Figure 2 is a plan view of the device, the same being partially broken away in section.

Mounted on the collars 10 are switching members 38 and 39 which, as shown particularly in Figure 2, are beveled at an angle of approximately 45 degrees with respect to the longitudinal axis of the coil 8. The bevels of the switch members 38 and 39 are parallel but are not concurrent, or, in other words, they are spaced from each other circumferentially about the collars 10. The purpose of this spacing will hereinafter more fully appear. Attached to the member 33 on the side of the pivot 34 opposite from that of the contacts 31 and 32 is a ball 40. The ball 40 is intended to abut the switching members 38 and 39 in order to throw the switch 25 from one side to the other. As shown, for example, in Figure 1, the ball 40 is contacting the switching member 38 and because of the beveled nature of the end of the member 38, is pushed in a direction toward the observer. When the coil 8 is moved to the opposite side of its stroke, as will hereinafter be discussed, the switch member 39, which is oppositely beveled and positioned radially with respect to the collar 10 toward the observer, will then contact the ball 40 and cause it to move in the direction away from the observer of Figure 1. Thus, the ball 40 will be moved alternately from and toward the observer of Figure 1 as the coil 8 reaches the end of each of its strokes.

Figure 3:
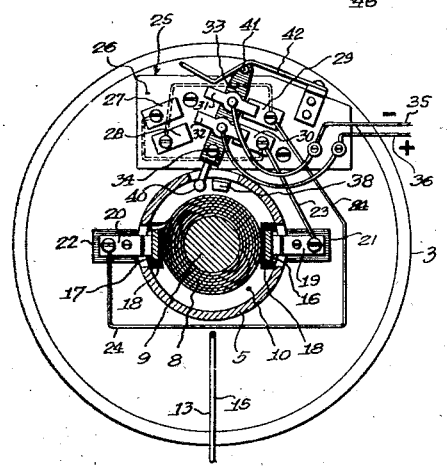
Figure 3 is a sectional view taken along the line 3—3 of Figure 1.

As shown in Figure 3, movement of the ball 40 causes pivoting of the member 33 about the pivot point 34. A pin 41 is attached to the upper end of the member 33 and contacts a spring 42 so bent as to tend to hold the member 33 in the position to which it is moved by the ball 40 and to restrain movement therefrom. In other words, the pin 41 is held by the spring 42 in the position shown in Figure 3 but when the ball 40 causes a pivotal movement of the member 33 about the pivot 34, the pin 41 is then held in the new position which it assumes by the spring 42 and movement from such new position is likewise constrained but not prevented.

Pivotal movement of the member 33 about the pivot 34 causes the contact 31 to contact alternately the contacts 27 and 29 and causes the contact 32 to contact alternately the contacts 28 and 30. As will be apparent from the wiring diagrams, this reverses the direction of flow of current through the lead wires 23 and 24 and through the contacts 19 and 20 and therefore reverses the direction of flow through the coil 8.

To each end of the core 9 are attached square non-ferrous rods 43 which extend through square holes in the cases 3 and 4. By appropriate linkage, the rods 43 may be made to cause a sweeping movement of a windshield wiper arm 44 or of a plurality of windshield wiper arms, if one is to be attached to each of the arms 43. The fact that the rods are square and fit in square apertures prevents rotation.

In operation, as indicated above, the coils 1 and 2 have magnetism such that, for example, their north poles are on the inner side and their south poles are on the outer side of the device. If, as shown in Figures 1 and 2, the coil 8 happens to have its north pole on the left-hand end and its south pole on the right-hand end, the coil 2 which has its north pole on the left-hand end and the south pole on the right-hand end will tend to expel the coil 8 or move it to the left as shown in the figure, and at the same time the coil 1 will tend to attract the coil 8. However, as the coil 8 reaches the left-hand end of its stroke, the switch member 39 will move the ball 40 in a direction away from the observer of Figure 1 and thereby cause the switch 25 to operate and this will reverse the direction of flow of electricity through the coil 8. Immediately thereupon, the left-hand end of the coil 8 will become a south pole and the right-hand end a north pole, and the magnetic attraction with respect to the coils 1 and 2, which remain permanent in their magnetism, will be reversed, and the coil 8 will tend to move in the opposite direction or toward the right by virtue of the attraction in coil 2 and repulsion in coil 1 both acting at the same time. Since the rods 43 move with the coil 8, a reciprocal movement is imparted to them and this reciprocal movement can be employed through the linkages shown in Figure 1 to cause a sweeping movement of the windshield wiper arm 44.

As soon as the coil 8 has approached the right-hand end of its stroke, the switching element 38 will cause the ball 40 to move in a direction toward the observer of Figure 1 and this again throws the switch 25 and reverses the direction of flow through the coil 8 and causes the coil to move toward the left. This alternation of direction of flow of current through coil 8 and consequent movement of the coil 8 causes a reciprocating movement of the rod 43.

It will be observed that the switching members 38 and 39 are of such length that they contact and move the ball 40 prior to the time that the collars 10 reach the bosses 6 and 7. This results in a reversing of the flow of current through the coil 8 before the end of the stroke of the coil. Such reversal of flow prior to the end of the stroke overcomes the inertia of the coil and prevents an abrupt stoppage of movement whereby smoother reciprocating motion is obtained.

It will also be observed that the length of the coil 8 is such that when, for example, as shown in Figure 1, the coil is at the right-hand end of its stroke and therefore within the field of the coil 2, nevertheless, a portion of the coil 8 projects within the field of the coil 1. In this manner the left-hand end of the coil 8 and the right-hand end of the coil 1 are within their mutual maximum magnetic fields and operation of the mechanism is thereby expedited.

A few refinements of the structure might be pointed out such as, for example, that air vents 45 in the cases 3 and 4 may be provided to allow the escape of air from within the tube 5 as the coil 8 reciprocates. The provision of these air holes prevents building up of air pressure at each end of the stroke of the coil 8. It might also be noted that a dust-proof, water-proof cover 46 may be provided to protect the switch mechanism 25 by sealing the cap between the cases 3 and 4. The cover 46 is made of any non-ferrous material and is of a split ring type so that it may be slid over the case 4 and will spring together to fit tightly and securely in the space between the cases 3 and 4. It also might be remarked that the core 9 may be laminated if it is so desired.

It might also be pointed out that instead of changing the polarity of the coil 8 at each end of the stroke, it is possible to change the magnetism of the coils 1 and 2 at each end of the stroke and to maintain the polarity of the magnetism of the coil 8 constant. In fact the coil 8 may be replaced by a permanent magnet rather than an electro-magnet. By appropriate switching mechanism the direction of the flow of the current through the coils 1 and 2 may be reversed at each end of the stroke so that the polarity of the large coils changes while the polarity of the inner coil 8 remains constant.

While a specific embodiment of the invention has been described and illustrated, it will be understood that various modifications may be made within the scope of the appended claims without departing from the spirit of the invention.

What I claim is:

1. In a reciprocating motor, a pair of magnets each having a pole of the same polarity adjacent the other, a coil slidable for reciprocating motion within and parallel to said first pair of magnets, and automatic means operable upon reciprocation of the slidable coil for reversing the flow of current through said coil to cause a reversal of movement of said coil, said automatic means being within the confines of the magnets and mounted therebetween whereby to lie wholly out of the path of obstructions.

2. In a motor, a pair of concentric, axially spaced magnets each having a pole of the same polarity adjacent the other, an electro-magnetic coil slidable for reciprocating motion along and within the axis of said pair of magnets, and automatic means operable upon reciprocation of the electro-magnetic coil for reversing the flow of current through said electro-magnetic coil to cause a reversal of movement of said electro-magnetic coil, said automatic means being wholly confined within the magnets and mounted therebetween whereby to be removed from contactual engagement with obstructions.

3. In a reciprocating electro-magnetic motor, a pair of concentric, axially spaced electro-magnets each having a pole of the same polarity adjacent the other and a pole of the same polarity remote from the other, an electro-magnetic coil slidable within said pair of magnets for reciprocating motion along and within the common axis of said pair of magnets, and switch means operable by the movement of said electro-magnetic coil for reversing the direction of flow of electrical energy through said electro-magnetic coil to reverse the polarity of said electro-magnetic coil and thereby reverse the direction of movement of said electro-magnetic coil, said switch means being located wholly within the confines of the electro-magnets whereby to be removed from the path of obstructions.

4. In a reciprocating electro-magnetic motor, a pair of concentric, axially spaced electro-magnets each having a pole of the same polarity adjacent the other and a pole of the same polarity remote from the other, an electro-magnetic coil slidable within said pair of magnets for reciprocating motion along the common axis of said pair of magnets, switching means interposed between said pair of magnets and confined within the peripheries of the magnets to reverse the direction of flow through said electro-magnetic coil and to be removed from the path of obstructions, and means carried by said electro-magnetic coil to engage and actuate said switching means.

5. In a reciprocating electro-magnetic motor, a pair of solenoids each having a pole of the same polarity adjacent each other and a pole of the same polarity remote from each other, an inner coil slidable for reciprocating motion along the common axis of said pair of solenoids, the polarity of said inner coil being reversible upon reversing the direction of flow of current through said coil, said inner coil being attracted alternately by one solenoid and then the other upon reversal of flow of current through said coil, and switching means interposed between said pair of solenoids to reverse the direction of flow of current through said inner coil, said switching means being wholly removed from obstructions exteriorly of the solenoids.

6. In a reciprocating electro-magnetic motor, a pair of solenoids each having a pole of the same polarity adjacent each other and a pole of the same polarity remote from each other, an inner coil slidable for reciprocating motion along and within the common axis of said pair of solenoids, the polarity of said inner coil being reversible upon reversing the direction of flow of current through said coil, said inner coil being attracted alternately by one solenoid and then the other upon reversal of flow of current through said coil, switching means interposed and confined between said pair of solenoids to reverse the direction of flow of current through said inner coil, said switching means being wholly removed from obstructions exteriorly of the solenoids and means carried by said inner coil to engage and actuate said switching means to reverse the flow of current through said inner coil at each end of the stroke of said inner coil.

7. In a reciprocating electro-magnetic motor, a pair of solenoids each having a pole of the same polarity adjacent each other and a pole of the same polarity remote from each other, an inner coil slidable for reciprocating motion along the common axis of said pair of solenoids, the polarity of said inner coil being reversible upon reversing the direction of flow of current through said coil, said inner coil being attracted alternately by one solenoid and then the other upon reversal of flow of current through said coil, switching means interposed and confined between said pair of solenoids to reverse the direction of flow of current through said inner coil, said switching means being wholly removed from obstructions exteriorly of the solenoids and means carried by said inner coil to actuate said switching means and to reverse the flow of current through said inner coil a predetermined interval prior to the end of each end of the stroke of said inner coil.

8. In a reciprocating electro-magnetic motor, a pair of solenoids each having a pole of the same polarity adjacent each other and a pole of the same polarity remote from each other, an inner coil slidable for reciprocating motion along and within the common axis of said pair of solenoids, the polarity of said inner coil being reversible upon reversing the direction of flow of current through said coil, said inner coil being attracted alternately by one solenoid and then the other upon reversal of flow of current through said coil, switching means interposed and confined between said pair of solenoids to reverse the direction of flow of current through said inner coil, said switching means having an operating lever projecting inwardly of said solenoids and a pair of oppositely beveled switching bars carried by said inner coil to engage said switching means operating lever and to reverse the flow of current through said inner coil, thereby reversing the direction of movement of said inner coil.

9. In a reciprocating electro-magnetic motor, a pair of solenoids each having a pole of the same polarity adjacent each other and a pole of the same polarity remote from each other, an inner coil slidable for reciprocating motion within and along the common axis of said pair of solenoids, the polarity of said inner coil being reversible upon reversing the direction of flow of current through said coil, said inner coil being attracted alternately by one solenoid and then the other upon reversal of flow of current through said coil, switching means interposed and confined between said pair of solenoids to reverse the direction of flow of current through said inner coil, said switching means including a lever projecting into the path of the inner coil, means carried by said inner coil to directly engage and actuate said switching means lever to reverse the flow of current through said inner coil at each end of the stroke of said inner coil, a pair of means carried by said inner coil, one of said last-named means being connected to each end of said inner coil, and a pair of sliding contacts to contact said last-named means, each of said sliding contacts being connected to said switching means.

10. In a reciprocating electro-magnetic motor, a pair of solenoids each having a pole of the same polarity adjacent each other and a pole of the same polarity remote from each other, an inner coil slidable for reciprocating motion along the common axis of said pair of solenoids, the polarity of said inner coil being reversible upon reversing the direction of flow of current through said coil, said inner coil being attracted alternately by one solenoid and then the other upon reversal of flow of current through said coil, switching means confined and interposed between said pair of solenoids to reverse the direction of flow of current through said inner coil and to be removed from external obstructions, an actuator for the switching means projecting into the path of the inner coil, means carried by said inner coil to engage and directly actuate said switching means actuator to reverse the flow of current through said inner coil at each end of the stroke of said inner coil, and means for varying the amount of current passing through said inner coil.

11. In a reciprocating electro-magnetic motor, a pair of solenoids each having a pole of the same polarity adjacent each other and a pole of the same polarity remote from each other, an inner coil slidable for reciprocating motion along and within the common axis of said pair of solenoids, the polarity of said inner coil being reversible upon reversing the direction of flow of current through said coil, said inner coil being simultaneously attracted by the first solenoid and repelled by the second solenoid and then alternately being simultaneously attracted by the second solenoid and repelled by the first solenoid upon reversal of flow of current through said coil, and switching means actuated by said inner coil to reverse the direction of flow of current through said inner coil said switching means being wholly confined between the solenoids to be removed from external obstructions and to be directly actuated by the inner coil.

WILLIAM G. HANCHOCK.